(12) United States Patent
Oroskar et al.

(10) Patent No.: US 10,044,474 B1
(45) Date of Patent: Aug. 7, 2018

(54) ADJUSTMENT TO RETRANSMISSION PROCESS BASED ON DOWNLINK COMP SERVICE

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 137 days.

(21) Appl. No.: 15/232,675

(22) Filed: Aug. 9, 2016

(51) Int. Cl.
| H04W 4/00 | (2018.01) |
| H04L 1/18 | (2006.01) |
| H04L 5/00 | (2006.01) |
| H04B 7/024 | (2017.01) |

(52) U.S. Cl.
CPC ........... *H04L 1/1861* (2013.01); *H04B 7/024* (2013.01); *H04L 5/0035* (2013.01)

(58) Field of Classification Search
CPC .................................................. H04L 1/1861
USPC ....................................................... 370/329
See application file for complete search history.

(56) References Cited

U.S. PATENT DOCUMENTS

| 9,264,192 | B2 | 2/2016 | Park et al. | |
| 2005/0213502 | A1* | 9/2005 | Convertino | H04L 1/0014 370/229 |
| 2011/0317637 | A1* | 12/2011 | Kim | H04L 1/1819 370/329 |
| 2012/0147815 | A1* | 6/2012 | Meyer | H04B 7/022 370/328 |
| 2012/0201121 | A1* | 8/2012 | Huang | H04L 1/0015 370/216 |
| 2015/0009930 | A1 | 1/2015 | Rapaport et al. | |
| 2017/0251521 | A1* | 8/2017 | Wei | H04L 5/0007 |
| 2017/0257192 | A1* | 9/2017 | Wang | H04L 1/1825 |
| 2017/0317791 | A1* | 11/2017 | Wiberg | H04L 1/1825 |

OTHER PUBLICATIONS

Kawser et al., "Limiting HARQ Retransmissions in Downlink for Poor Radio Link in LTE," Sep. 2012, pp. 707-709, vol. 2, No. 5.
Makki et al., "On an HARQ-based coordinated multi-point network using dynamic point selection," EURASIP Journal on Wireless Communications and Networking, 2013, 11 pages, vol. 209.

* cited by examiner

*Primary Examiner* — Christopher P Crompton

(57) ABSTRACT

Disclosed herein are methods and systems for adjusting the maximum number of downlink retransmissions that are permissible for a user entity, according to whether or not coordinated multipoint service is being provided for the user entity.

20 Claims, 5 Drawing Sheets

ADJUSTMENT TO RETRANSMISSION PROCESS BASED ON DOWNLINK COMP SERVICE

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user).

In general, each coverage area may operate on one or more carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot into resource blocks. When a UE is positioned within coverage of a base station in such a system, the UE may register or "attach" with the base station on a particular carrier on which the base station is configured to provide, and the base station may then schedule particular downlink and uplink resource blocks on that carrier to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

In such LTE systems, a Hybrid Automatic Repeat Request (HARQ) procedure can be used. According to the HARQ approach, after a transmitting entity has transmitted a block of data, the transmitting entity waits to receive a HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data. The transmitting entity may also re-transmit the data if the transmitting entity does not receive any HARQ response within a certain period of time.

This re-transmission approach can allow data to be successfully transmitted from a transmitting entity to a receiving entity even when there is a substantial probability that the transmitted data will be received with one or more errors, for example, because of poor radio frequency (RF) conditions. Specifically, the data can be re-transmitted multiple times until the data is received without errors.

Further, in some implementations, LTE supports a HARQ procedure which utilizes a bundling option for data transmissions by a UE in the Physical Uplink Shared Channel (PUSCH). This bundling option may be referred to as transmission time interval (TTI) bundling. Normally, a UE transmits data in one transmission time interval (TTI), which corresponds to a 1 millisecond (ms) subframe, and then waits to receive a HARQ response before re-transmitting the data or transmitting additional data. However, when TTI bundling is used, the UE transmits the same data in multiple consecutive TTIs (i.e., a "bundle" of TTIs) and then waits to receive a HARQ response. In this way, the UE can transmit multiple instances of the same data, which allows for more robust reception of the data, but without the delay that would be associated with the UE transmitting the data multiple times and waiting for a HARQ response after each transmission.

In a further aspect of LTE, to improve the quality of service at cell edges, 3GPP LTE-A Release 11 introduced a number of Coordinated Multipoint (CoMP) schemes. By implementing such CoMP schemes, a group or cluster of base stations may improve service at cell edges by coordinating transmission and/or reception in an effort to avoid inter-cell interference, and in some cases, to convert inter-cell interference into a usable signal that actually improves the quality of service that is provided.

LTE-A Release 11 defined a number of different CoMP schemes or modes for both the uplink (UL) and the downlink (DL). For the downlink, there or two basic types of CoMP modes: coordinated scheduling/beamforming (CSCH or DL-CSCH) and joint processing. When coordinated scheduling/beamforming is implemented for a given UE, data is only sent to the given UE in one sector at a time, but scheduling and beamforming decisions for the given UE are coordinated amongst multiple sectors. When a type of joint processing referred to as joint transmission is implemented for a given UE, data is transmitted to the UE in multiple sectors concurrently.

Overview

A network can implement an automatic retransmission process, such as Hybrid Automatic Repeat Request (HARQ), in conjunction with coordinated multipoint (CoMP). While CoMP can improve quality of service, it also can increase the amount of network resources utilized for each UE, and can increase traffic on backhaul links, as compared to when CoMP is not utilized. And, if HARQ is implemented in conjunction with a joint transmission CoMP scheme for downlink communications, this can further increase the amount of downlink resources utilized for each UE. Specifically, when HARQ is implemented in conjunction with joint transmission, and a transmission to a given UE is unsuccessful (e.g., as indicated by receipt of a NACK), the network may respond by re-transmitting in all sectors that are coordinating to provide downlink CoMP service to the given UE. Further, the same transmission may be attempted up to a predetermined number of times in all sectors providing downlink CoMP, as specified by a maximum retransmission parameter for HARQ (e.g., allowing up to 5 attempts in each sector).

In order to balance the benefits of HARQ and CoMP with the need to utilize network resources efficiently, exemplary embodiments may detect when downlink CoMP is being utilized for the given UE, and responsively reduce the maximum number of HARQ retransmissions that are possible for a given UE in some of or all the sectors that are coordinating to provide downlink CoMP service for the given UE. Specifically, when the network implements joint transmission for downlink communications to a given UE, the serving base station or base stations may responsively reduce the maximum retransmission parameter for HARQ for all the sectors in which joint transmission is being coordinated for the given UE.

Further, the reduction in the downlink maximum HARQ retransmission parameter (DL_MAX_HARQ) may be implemented differently, or in the same manner, in the sectors that are coordinating to provide downlink CoMP service to a given UE. For example, the value of the DL_MAX_HARQ parameter could be reduced in all coordinating sectors, but reduced by a lesser amount in the serving sector than in neighbor sectors providing downlink CoMP. For instance, if DL_MAX_HARQ is set by default to allow a maximum of 5 attempts in sectors coordinating to provide downlink CoMP for a given UE, then the DL_MAX_HARQ parameter for the UE's serving sector may be reduced to allow a maximum of 3 transmission attempts to the UE, while the DL_MAX_HARQ parameter for each neighbor sector may be reduced to allow a maximum of 2 transmission attempts. Variations are of course possible.

For instance, in one aspect, an exemplary method involves: (a) determining that downlink coordinated multipoint (CoMP) service is available to a user equipment (UE) via coordination of at least a first sector and a second sector, wherein respective maximum Hybrid Automatic Repeat Request (HARQ) retransmission parameters for UEs in the first and second sectors are both set to a first value for UEs that are not served with downlink CoMP; (b) responsive to determining that downlink CoMP service is available to the UE, reducing the maximum HARQ retransmission parameter for the UE in the second sector to a second value that is less than the first value; and (c) providing downlink CoMP service to the UE in the first and second sectors according to the second value for the maximum HARQ retransmission parameter in the second sector and a current value for the maximum HARQ retransmission parameter in the first sector.

In another aspect, an exemplary system includes at least one communication interface operable for backhaul communications between a first base station and a second base station, at least one processor, and program instructions stored in a non-transitory computer readable medium. The program instructions are executable by the at least one processor to: (a) determine that downlink coordinated multipoint (CoMP) service is available to a user equipment (UE) via coordination of at least a first sector and a second sector, wherein respective maximum Hybrid Automatic Repeat Request (HARQ) retransmission parameters for UEs in the first and second sectors are both set to a first value for UEs that are not served with downlink CoMP; (b) responsive to determining that downlink CoMP service is available to the UE, reduce the maximum HARQ retransmission parameter for the UE in the second sector to a second value that is less than the first value; and (c) cause downlink CoMP service to be provided to the UE in the first and second sectors according to the second value for the maximum HARQ retransmission parameter in the second sector and a current value for the maximum HARQ retransmission parameter in the first sector.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Further, methods and systems may be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

I. EXEMPLARY NETWORK ARCHITECTURE

Figure 1:
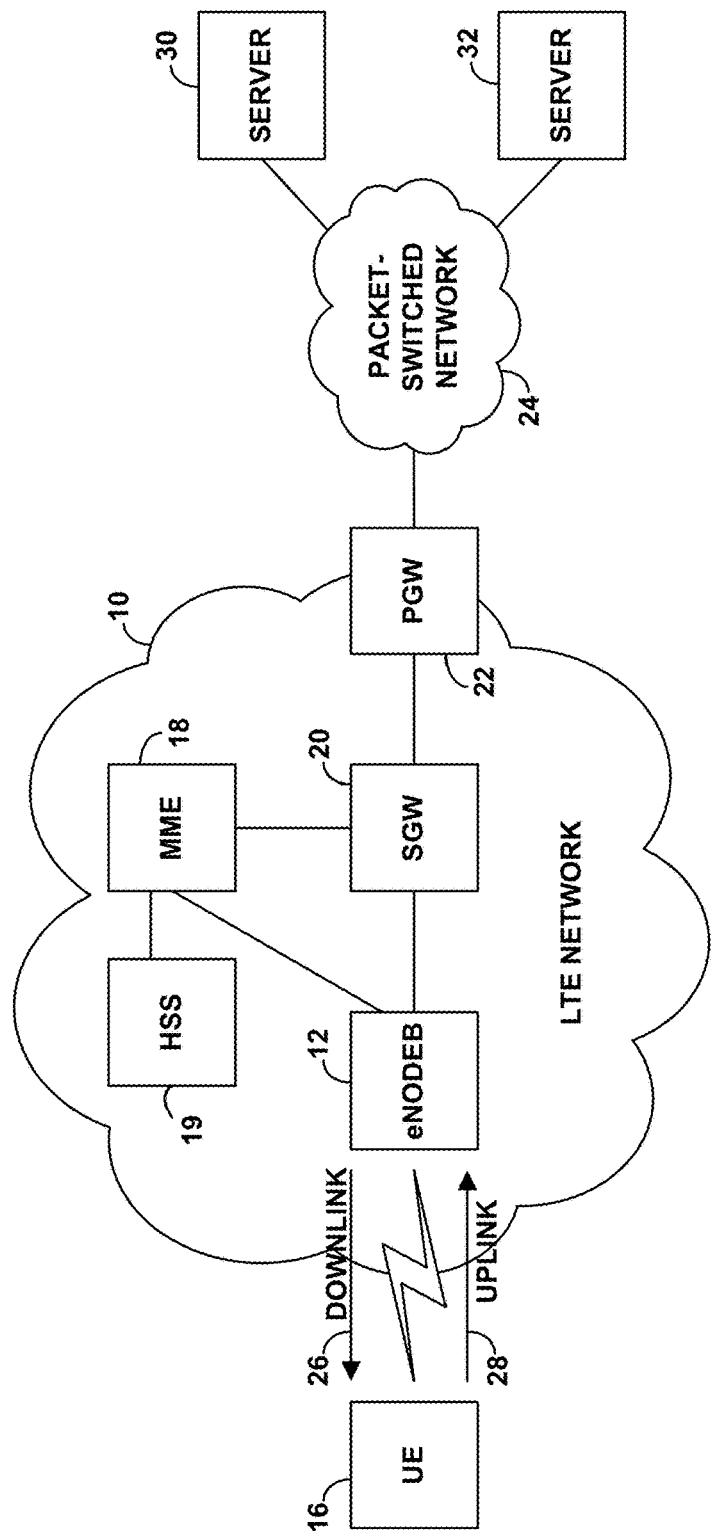
FIG. 1 is a simplified block diagram of a wireless communication system in which the present method and system can be implemented, according to an exemplary embodiment.

Referring to the drawings, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network 10 includes a base station (eNodeB) 12, which has one or more antenna structures and associated equipment for providing one or more LTE coverage areas in which to serve UEs such as an example UE 16 as shown.

The eNodeB 12 has a communication interface with a mobility management entity (MME) 18 that functions as a signaling controller for the LTE network 10. Further, the eNodeB 12 has a communication interface with a serving gateway (SGW) 20. MME 18 may be communicatively coupled to a home subscriber server (HSS) 19, which stores subscriber information, and may also be communicatively coupled to the SGW 20. SGW 20 in turn has a communication interface with a packet-data network gateway (PGW) 22, which may provide connectivity with a packet-switched network 24. In practice, the illustrated components of the LTE network 10 may sit as nodes on a private packet-switched network owned by an operator of the LTE network 10, and thus the various communication interfaces may be logical interfaces through that network.

As illustrated, the air interface 14 for a given sector served by eNodeB 12 may have a downlink direction 26 from the eNodeB 12 to the UE 16, and an uplink direction 28 from the UE 16 to the eNodeB 12. Further, the eNodeB 12 and the UE 16 may be configured (e.g., licensed and programmed) to support air interface communication on various particular carriers, which may be FDD or TDD, for example. Each such carrier and/or its particular downlink and uplink channels may be identified by one or more globally unique identifiers per industry standard, so that the eNodeB 12 and a served UE can refer to particular carriers by those identifiers.

According to LTE, each carrier's downlink channel may then define various sub-channels, such as a physical downlink control channel (PDCCH) for carrying scheduling directives and other control signaling from the eNodeB 12 to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB 12 and a physical uplink shared channel (PUSCH) for carrying scheduled uplink data communication.

With this arrangement, when the UE 16 enters into coverage of the eNodeB 12, the UE 16 may detect the eNodeB's 12 coverage on a particular carrier, and the UE 16 may engage in an attach process or handover process to register with the LTE network 10 on that carrier. For instance, the UE 16 may initially transmit to the eNodeB 12 an attach request, which the eNodeB 12 may pass along to the MME 18, triggering a process of authenticating the UE 16 and establishment of one or more logical bearer connections for the UE 16 between the eNodeB 12 and the PGW 22.

Further, the UE 16 may engage in signaling with the eNodeB 12 to establish a radio-link-layer connection (i.e., air interface connection) on the detected carrier, so that the eNodeB 12 may then serve the UE 16 on that carrier. For instance, the UE 16 and the eNodeB 12 may exchange radio resource control RRC configuration messaging to prepare the eNodeB 12 to serve the UE 16 on the carrier and to prepare the UE 16 to be served on the carrier. In this process, the eNodeB 12 may store a context record for the UE 16, indicating that the eNodeB 12 is serving the UE 16 on the particular carrier, so that the eNodeB 12 may then serve the UE 16 on the indicated carrier (e.g., then exchanging control signaling and bearer traffic with the UE 16 on that carrier) per that context record. Further, the UE 16 may store a context record indicating that the UE 16 is being served on that carrier, so that the UE 16 can then be served on that carrier (e.g., then exchanging control signaling and bearer traffic with the eNodeB 12 on that carrier) per that context record. As such, the radio-link-layer connection could be considered to effectively encompass initially just that one carrier.

II. COORDINATED MULTIPOINT

As noted above, a network such as communication network 10 may implement various types of coordinated multipoint (CoMP) service, through which base stations (e.g., eNodeBs) may coordinate to improve uplink and/or downlink service. CoMP schemes designed for coordinated transmission by base stations may be referred to as downlink CoMP modes, while CoMP schemes designed for coordinated reception may be referred to as uplink CoMP modes.

Figure 2:
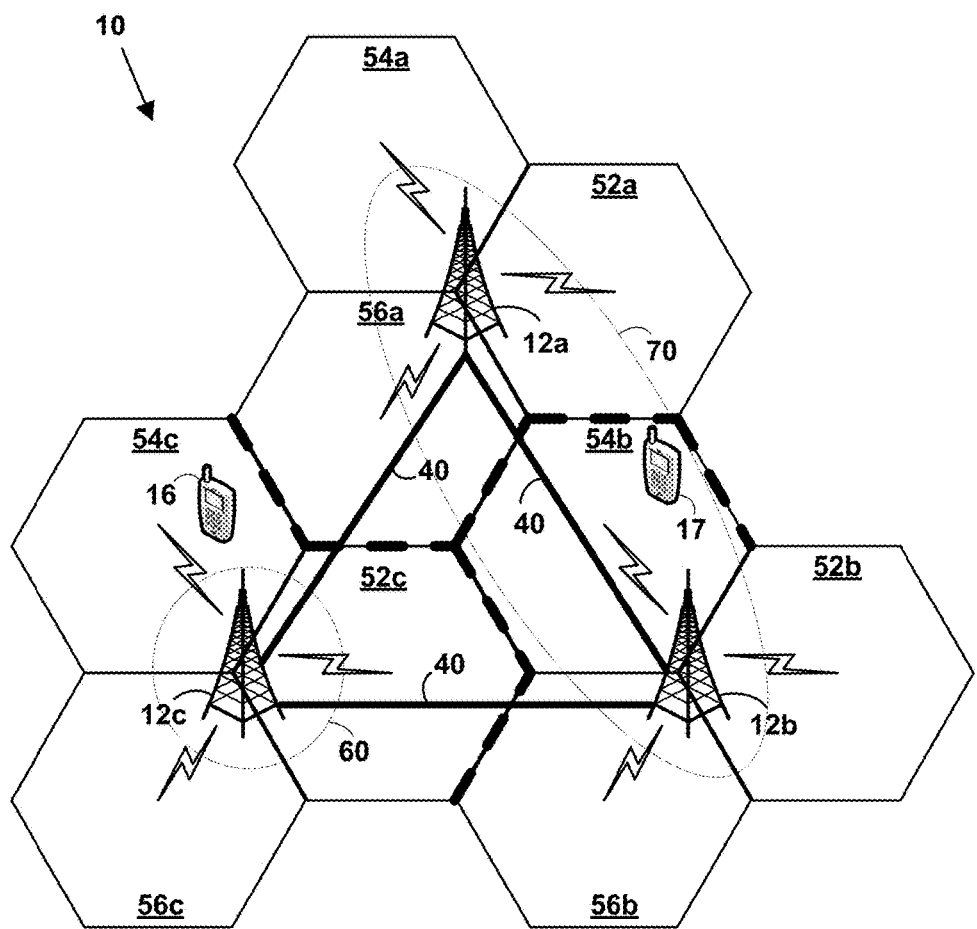
FIG. 2 is a simplified block diagram illustrating a portion of communication network in which coordinated multipoint service may be provided for uplink and/or downlink communications, according to an exemplary embodiment.

FIG. 2 is a simplified block diagram illustrating a portion of communication network 10 in which CoMP schemes may be implemented for uplink and/or downlink communications. In particular, FIG. 2 shows a portion of an LTE network, which includes three eNodeBs 12a to 12c. More or less eNodeBs, and/or other types of access points or base transceiver stations, are also possible. As shown, eNodeB 12a is serving three coverage areas or sectors 52a, 54a, and 56a, eNodeB 12b is serving three coverage areas or sectors 52b, 54b, and 56b, and eNodeB 12c is serving three coverage areas or sectors 52c, 54c, and 56c. Further, a UE 16 is operating in sector 54c, which is served by eNodeB 12c. Further, while not shown in FIG. 2, each eNodeB 12a to 12c may be configured in the same or in a similar manner as the eNodeB 12 shown in FIG. 1. For instance, each eNodeB 12a to 12c may be communicatively coupled to an MME and/or an SGW. Further, note that some or all of eNodeBs 12a to 12c may be communicatively coupled to the same MME and/or the same SGW. Alternatively, each eNodeB 12a to 12c might be connected to a different MME and/or different SGW.

In some cases, downlink CoMP may be implemented by a single base station, which provides service in multiple sectors. This type of CoMP scheme may be referred to as an "intra base station" or "intra-eNodeB" CoMP scheme. For example, eNodeB 12c may provide downlink CoMP by jointly transmitting data to a UE in two or more of the sectors 52c, 54c, and 56c that are served by eNodeB 12c. Further, eNodeB 12c may define a CoMP group 60 to include all its sectors 52c, 54c, and 56c. As such, eNodeB 12c may adaptively use joint transmission techniques when the downlink signal to UE 16 is transmitted simultaneously in two or more of the sectors 52c, 54c, and 56c that it serves.

In other cases, downlink CoMP may be implemented by multiple base stations, which may each provide service in multiple sectors or only in one cell. This type of CoMP scheme may be referred to as an "inter base station" or "inter-eNodeB" CoMP scheme. For example, eNodeBs 12a and 12c may provide downlink CoMP by coordinating to jointly transmit data to UE 17 in two or more of the sectors 52a, 54a, 56a, 52b, 54b, and 56b that are served by eNodeBs 12a and 12b.

When downlink CoMP involves multiple base stations (e.g., inter-base station CoMP), base stations may coordinate with one another via a backhaul network. For example, in an LTE network, eNodeBs may communicate via links that are referred to as X2 interfaces. X2 is described generally in Technical Specification ETSI TS 136 420 for LTE; Evolved Universal Terrestrial Radio Access Network (E-UTRAN); X2 general aspects and principles. In FIG. 2, eNodeBs 12a to 12c are communicatively connected via X2 links 40. It should be understood, however, that other types of backhaul communications are also possible.

In both intra-eNodeB and inter-eNodeB CoMP, there may be pre-defined groups of sectors, which may be referred to herein as "CoMP groups" or "CoMP clusters." The eNodeB or eNodeBs that serve the sectors in a CoMP group are configured to provide downlink CoMP via some or all of the sectors in the group.

Further, the source eNodeB (also referred to as a serving eNodeB) may determine which sectors from the CoMP group should be used to provide uplink CoMP for a given UE, at a given point in time. In particular, the source eNodeB may determine a subset of the CoMP group that should be utilized for a given UE, based on various factors. Possible factors include, but are not limited to, whether or not a signal from the given UE is received in a candidate sector, signal strength and/or other air interface conditions in the candidate sector, and/or processing load at the eNodeB serving the candidate sector, among other possibilities.

III. RETRANSMISSION PROCESSES

As noted above, a retransmission process may be implemented in conjunction with CoMP. When such a retransmission process is implemented, and data that is transmitted by a transmitting entity to a receiving entity is not received by the receiving entity, or is received by the receiving entity with one or more errors, the data may be retransmitted. The retransmission of data could occur either automatically or in response to feedback from the receiving entity.

For example, in Long Term Evolution (LTE) systems, and in other systems, a Hybrid Automatic Repeat Request (HARQ) procedure may be utilized. In the HARQ approach, after a transmitting entity has transmitted a block of data, the transmitting entity waits to receive an HARQ response from the receiving entity. If the transmitting entity receives a positive acknowledgement (ACK) as the HARQ response, then no-retransmission is needed and the transmitting entity can transmit additional data. If the transmitting entity receives a negative acknowledgement (NACK) as the HARQ response, then the transmitting entity retransmits the data. The transmitting entity may also retransmit the data if the transmitting entity does not receive any HARQ response within a certain period of time.

In some embodiments, a base station that seeks to transmit a full packet to a WCD may instead transmit one or more HARQ subpackets. The HARQ subpackets may be derived from the full packet, and therefore may contain copies of part or all of the full packet. Each HARQ subpacket may also contain an extent of FEC coding. Further, when downlink CoMP is implemented in conjunction with HARQ, each subpacket may be jointly transmitted in all sectors that are coordinating to provide a UE with downlink CoMP service. Once the UE is able to decode the full packet, it may transmit a positive acknowledgment (P-ACK) to the base station. Alternatively, if the UE is not able to decode the full packet, the UE sends a negative acknowledgment (N-ACK), which prompts the base station or base stations serving the UE to initiate a re-transmission process.

However, HARQ typically limits the number of attempts to re-transmit a given packet that are possible. In particular, the respective maximum HARQ retransmission parameter (DL_MAX_HARQ) may establish the maximum number of attempts that can be made to transmit a given packet. For example, if DL_MAX_HARQ is set to five for a given UE, then a base station serving the UE can make up to five attempts to transmit the same packet, before deeming the communication unsuccessful and ceasing efforts to transmit the packet. Other examples are of course possible.

Note that the maximum HARQ retransmission parameter may be set on a per-sector or per-base-station basis, or may be set on a per-UE basis. In the former implementation, an exemplary method may be utilized to detect when a particular sector has downlink CoMP enabled for the sector and responsively adjust the maximum retransmission parameter that applies for all downlink communications in the sector. In the latter implementation, an exemplary method may be utilized to determine whether or not a particular UE is being provided with downlink CoMP service, and adjust the maximum retransmission parameter accordingly for that particular UE. This process may then be repeated for each UE being served in the sector. Further, note that exemplary methods may apply in conjunction with other retransmission processes than HARQ, without departing from the scope of the invention.

IV. EXEMPLARY RAN COMPONENTS

Figure 3:
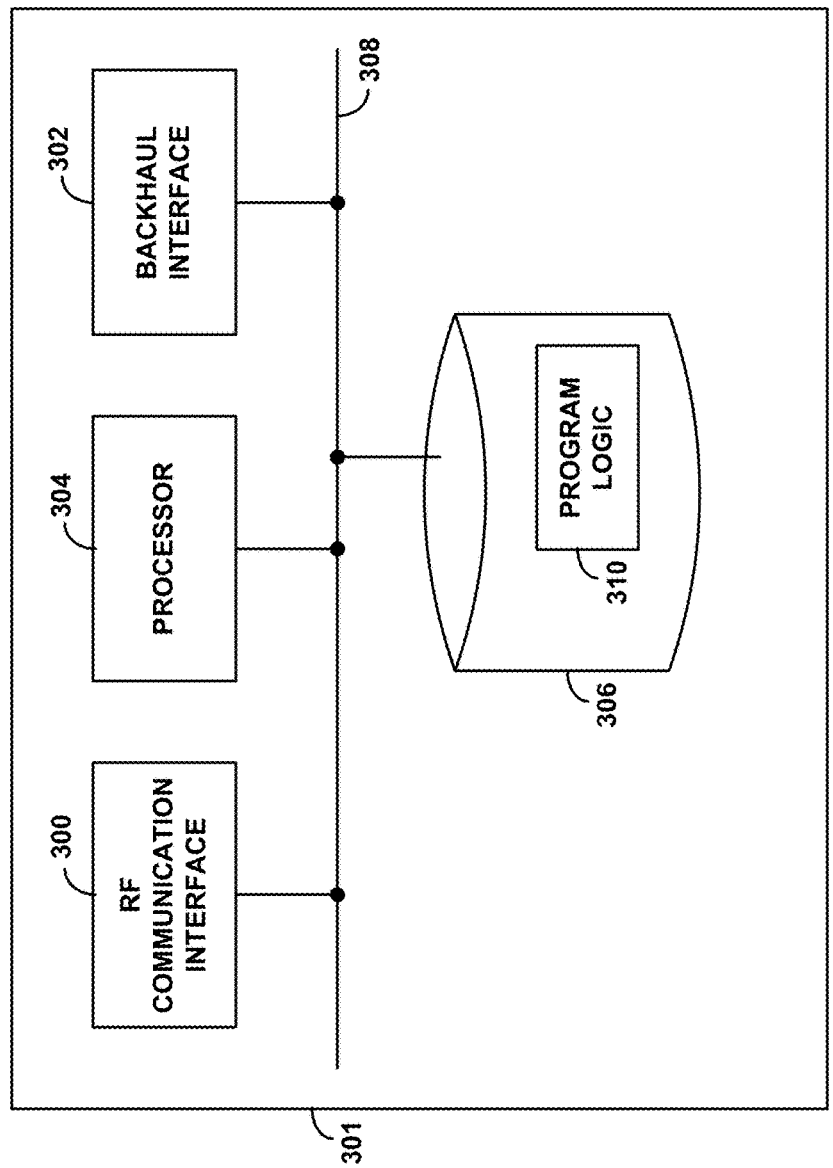
FIG. 3 is a simplified block diagram exemplifying a network component, according to an exemplary embodiment.

FIG. 3 is a simplified block diagram exemplifying a network component, according to an exemplary embodiment. In particular, FIG. 3 illustrates functional components that might be found in a network component 301 that is arranged to operate in accordance with the embodiments herein. As shown, the network component 301 may include a communication interface 300, a backhaul interface 302, a processor 304, and data storage 306, all of which may be communicatively linked together by a system bus, network, or one or more other connection mechanisms 308.

In practice, network component 301 may take the form of an eNodeB, or may take the form of another component of an LTE or CDMA network. Further, the illustrated components of network component 301 (e.g., communication interface 300, a backhaul interface 302, a processor 304, and/or data storage 306) may be distributed and/or subdivided between one or more entities in an LTE network and/or in a CDMA network. It should be understood that an exemplary system may also take the form of another network entity or combinations of other network entities, without departing from the scope of the invention.

In network component 301, communication interface 300 may comprise one or more or wired or wireless communication interfaces and/or other associated equipment for engaging in communications with other network entities and/or for engaging in RF communications with mobile stations according to one or more air interface protocols. Backhaul interface 302 may comprise any sort of communication link or mechanism enabling the network component 301 to exchange signaling and bearer data with other network entities, such as an X2 link, for instance. Further, processor 304 may comprise one or more processors (e.g., general purpose and/or special purpose processors), such as microprocessors for instance.

Data storage 306 may be a non-transitory computer readable medium. For example, data storage 306 may take the form of one or more volatile and/or non-volatile storage components, such as magnetic, optical, or organic storage components, integrated in whole or in part with processor 304. As further shown, data storage 306 contains program logic 310 (e.g., machine language instructions) executable by processor 304 to carry out various functions, such as the functionality of the exemplary methods and systems described herein.

In an exemplary embodiment, program logic 300 may include at least program instructions stored in data storage 306, which are executable by processor 304 to: (i) determine that downlink coordinated multipoint (CoMP) service is available to a UE via coordination of a plurality of sectors comprising at least a first sector and a second sector, (ii) responsive to determine that downlink CoMP service is available to the UE, reducing the maximum HARQ retransmission parameter for the UE in at least the second sector to a second value that is less than a default value used when downlink CoMP is not utilized for a given UE, and (iii) provide downlink CoMP service to the UE in at least the first and second sectors according to the second value for the maximum HARQ retransmission parameter in the second sector and a current value for the maximum HARQ retransmission parameter in the first sector.

V. EXEMPLARY METHODS

Figure 4:
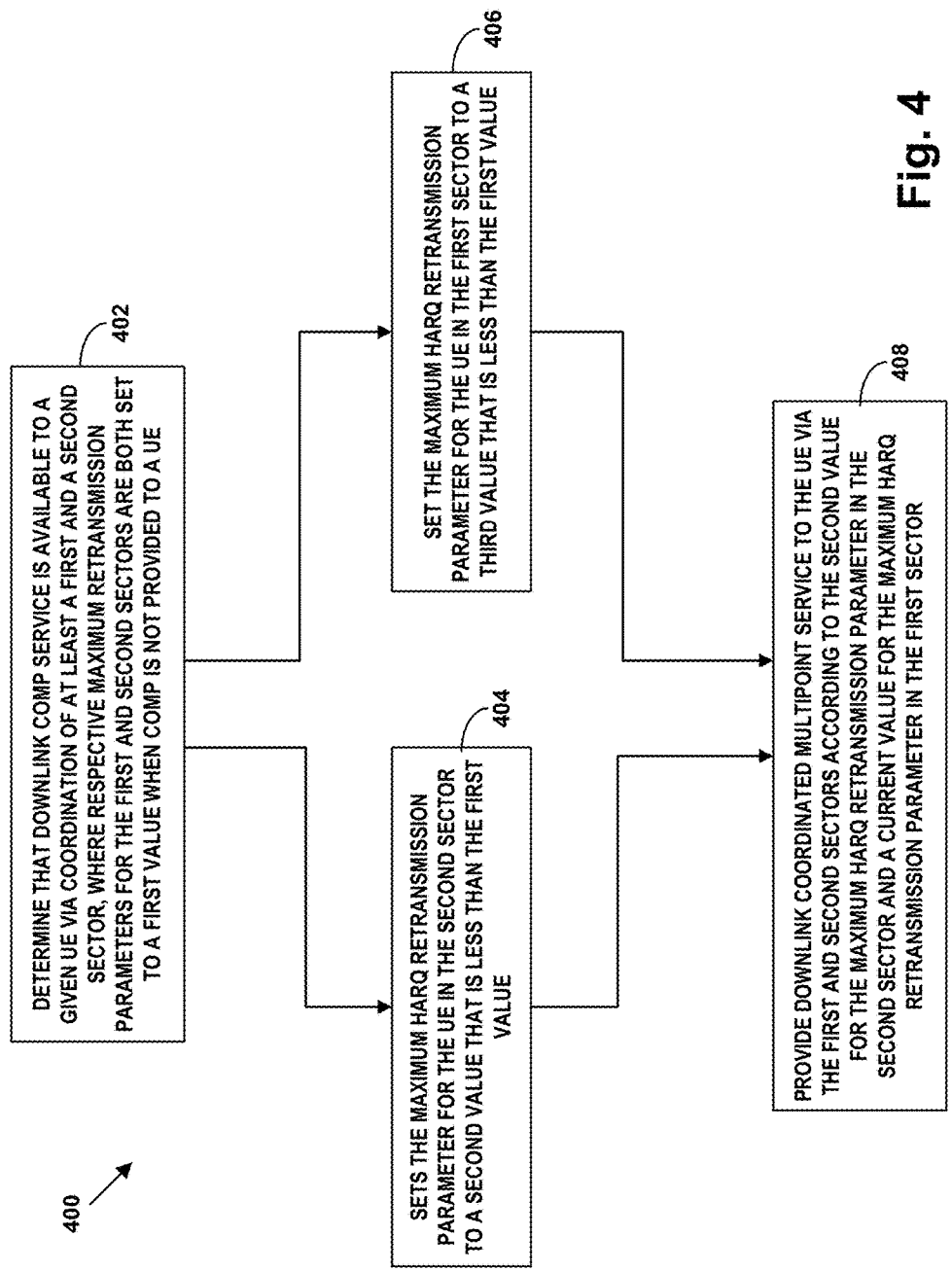
FIG. 4 is flow chart illustrating a method, according to an exemplary embodiment.

FIG. 4 is flow chart illustrating a method 400, according to an exemplary embodiment. Method 400 may be carried out by a base station or access node in a radio access network. For instance, in an exemplary implementation, method 400 may be carried out by an eNodeB (or possibly multiple eNodeBs) that is configured for downlink CoMP service and a retransmission process such as HARQ. Of course, it should be understood that method 400 or portions thereof may be implemented by other entities or combinations of entities, without departing from the scope of the invention.

In the example illustrated by method 400, downlink CoMP service may be available to a given UE via coordination of at least a first sector and a second sector. The first and second sector may both be served by a base station carrying out method 400. Alternatively, the base station carrying out method 400 may serve the first sector, while a different base station serves the second sector. Furthermore, respective maximum HARQ retransmission parameters may be defined for the first and second sectors, and may both be set to a first value when CoMP is not available to a given UE. Yet further, it should be understood that method 400 may also be implemented in scenarios where more than two sectors, and perhaps more than two base stations, coordinate to provide downlink CoMP service for a given UE.

Referring now to method 400 in greater detail, block 402 involves a base station (e.g., the source eNodeB for downlink CoMP), determining that downlink CoMP service is available to a given UE via coordination of at least a first and a second sector, where respective maximum retransmission parameters for the first and second sectors are both set to a first value when CoMP is not provided to a UE, and where at least the first sector is served by the base station carrying out method 400. In response to determining that downlink CoMP service is available to the given UE, the base station sets the maximum HARQ retransmission parameter for the UE in the second sector to a second value that is less than the first value, as shown by block 404. Optionally, the base station may also set the maximum HARQ retransmission parameter for the UE in the first sector to a third value that is less than the first value, as shown by block 406. As such, the maximum HARQ retransmission parameter for the UE may be reduced in one or both of the sectors, as compared to when a downlink CoMP is not utilized for the UE.

Downlink CoMP service may then be provided to the UE in the first and second sectors according to the second value for the UE's maximum HARQ retransmission parameter in the second sector and a current value for the UE's maximum HARQ retransmission parameter in the first sector, as shown by block 408. Note that the current value may be the first value; e.g., in a scenario where the maximum HARQ retransmission parameter is reduced in the second sector (e.g., in a neighbor sector of a CoMP group), but not in the first sector (e.g., not in the source sector of a CoMP group). Alternatively, the current value for the maximum HARQ retransmission parameter in the first sector may be the third value determined at block 406.

a. Determining that Downlink CoMP Service is Available to a Given UE

At block 402, the base station may use various techniques to determine that downlink CoMP is available to a given UE.

For example, the base station may determine whether the UE itself is configured for CoMP. If the UE is not able to receive and decode coordinated transmissions in multiple sectors, then downlink CoMP should be disabled for the UE, regardless of the network's capabilities.

Additionally or alternatively, when a UE connects to a base station, the base station may determine whether the network (e.g., the base station itself and/or other network components) is configured to provide downlink CoMP service. In such an embodiment, optionally, the base station could also evaluate whether or not the UE is located such that downlink CoMP is available. More specifically, the base station may determine whether the UE is within range of at least sectors that can coordinate to provide downlink CoMP service to the UE.

In some embodiments, when a UE connects to a base station that is part of a CoMP group and configured (e.g., operable) to provide CoMP, CoMP may or may not be enabled. (Note that CoMP may be enabled or disabled in a base station or group of base stations for various reasons; such as when air interface traffic and/or backhaul traffic levels are high). In such an embodiment, rather than simply determining the network's capabilities and/or the UE's capabilities, the source base station may determine based on various CoMP setting at the base station or elsewhere in the network, whether CoMP is enabled in the sectors it serves (and/or in neighbor sectors served by other base stations).

Other techniques for determining that downlink CoMP is available to a particular UE, and variations on those described herein, are also possible.

b. Adjusting the Maximum Number of Transmission Attempts

When it is determined that downlink CoMP service is available to a particular UE, blocks 404 and/or 406 of method 400 may be carried out to adjust the downlink maximum HARQ retransmission parameter for (DL_MAX_HARQ) in one or more of the sectors that can coordinate to provide downlink CoMP service to the UE. Generally, a DL_MAX_HARQ parameter may be adjusted for the given UE in each sector that is coordinating to provide the UE with downlink CoMP service.

In some embodiments, the DL_MAX_HARQ parameter is set to a first value when CoMP is not being utilized. In such embodiments, the first value of DL_MAX_HARQ may be the same across all sectors, or vary from sector to sector. In either case, when downlink CoMP is used to serve a particular UE, this may be detected, and the value of DL_MAX_HARQ will responsively be reduced in some or all sectors that are coordinating to provide downlink CoMP to respectively reduced values that are less than the first value. Blocks 404 and 406 provide an example of such reductions in two sectors coordinating to provide downlink CoMP. As a specific example, if the DL_MAX_HARQ parameter initially allow for up to five attempts to transmit the same data to a given UE, the DL_MAX_HARQ may be adjusted for the given UE, in each sector that is coordinating to provide downlink CoMP service to the UE, to allow for up to three attempts (or some other value that is less than the initial setting). Of course, it should be understood that DL_MAX_HARQ may be reduced for the particular UE in more than two sectors, in a scenario where more than two sectors are coordinating for downlink CoMP service.

In some embodiments, the value of the DL_MAX_HARQ parameter could be adjusted differently in different sectors that are providing CoMP to a given UE. For example, the value of the DL_MAX_HARQ parameter could be reduced in all coordinating sectors, but reduced by a lesser amount in the serving sector than in neighbor (e.g., secondary) sector(s) in a CoMP group serving the UE. As a specific example, consider a scenario where the first value for the maximum HARQ retransmission parameter is set to five (when CoMP is not utilized) in all sectors in a CoMP group. However, when a UE is being provided with downlink CoMP service, the maximum HARQ retransmission parameter may be reduced to three, for the UE, in the serving sector, while maximum HARQ retransmission parameter may be reduced to two, for the UE, in the neighbor sector or sectors in the UE's CoMP group.

In other cases, the value of the DL_MAX_HARQ parameter could be reduced in the serving sector of the UE's CoMP group and/or in a subset of the neighbor sectors in the UE's CoMP group, but not reduced in all sectors within the UE's CoMP group. Other techniques for setting the DL_MAX_HARQ parameter in the sectors providing downlink CoMP to a UE are also possible.

c. Subsequent Increase to HARQ Retransmission Parameter

In a further aspect, historical data regarding the success and or failure of communications using an automatic retransmission process (e.g., HARQ) can be generated and maintained on a per-UE basis by a radio access network. Such data may be maintained in data storage at any suitable component of a radio access network. A base station (e.g., an eNodeB) may be able to access such historical data, and based on such data, may determine that a particular communication to a UE has failed. And, in response, the base station increase the maximum number of retransmission attempts for a UE that previously had its maximum number of retransmission attempts in a sector reduced in accordance with an exemplary method, such as method 400. This may further help to balance the desire for successful data transmissions at cell edges with the desire to use backhaul capacity (e.g., over X2 links) efficiently.

For example, consider a UE that is being provides with downlink CoMP service in a first and a second sector, according to respective reduced values for the maximum HARQ retransmission parameter in the two sectors, which are determined in accordance with method 400. In this scenario, while providing downlink CoMP service to the UE in the first and second sectors according to the first and second reduced values for the maximum HARQ retransmission parameter, the base station may initiate communication to the UE using downlink CoMP in at least the first and second sectors, and determine that the communication was unsuccessful (e.g., due to receipt of a NACK from the UE). The communication is then retransmitted in the first and second sectors to the extent allowed by the first and the second reduced values of the maximum HARQ retransmission parameter, without success (e.g., as indicated by receipt of a NACK after each attempt). When this occurs (or perhaps after there is some pattern of repeated failures to the same UE), the base station may responsively: (a) increase the HARQ retransmission parameter for the first sector, (b) increase the HARQ retransmission parameter for the second sector, or (c) increase the respective HARQ retransmission parameters for both the first and second sectors. Further, as with other exemplary methods disclosed herein, this functionality may be extended to scenarios where more than two sectors coordinate to provide downlink CoMP service to a UE.

d. Using Backhaul Loading as Further Basis for Adjusting Transmission Scheme

In a further aspect, adjustments to the maximum number of retransmission attempts according to whether or not downlink CoMP is utilized may be part of a larger downlink transmission scheme. As such, a method such as method 400 may be combined with other techniques and/or additional functionality in order to balance the desire to improve service at cell edges with the desire to use network resources in an efficient manner.

Figure 5:
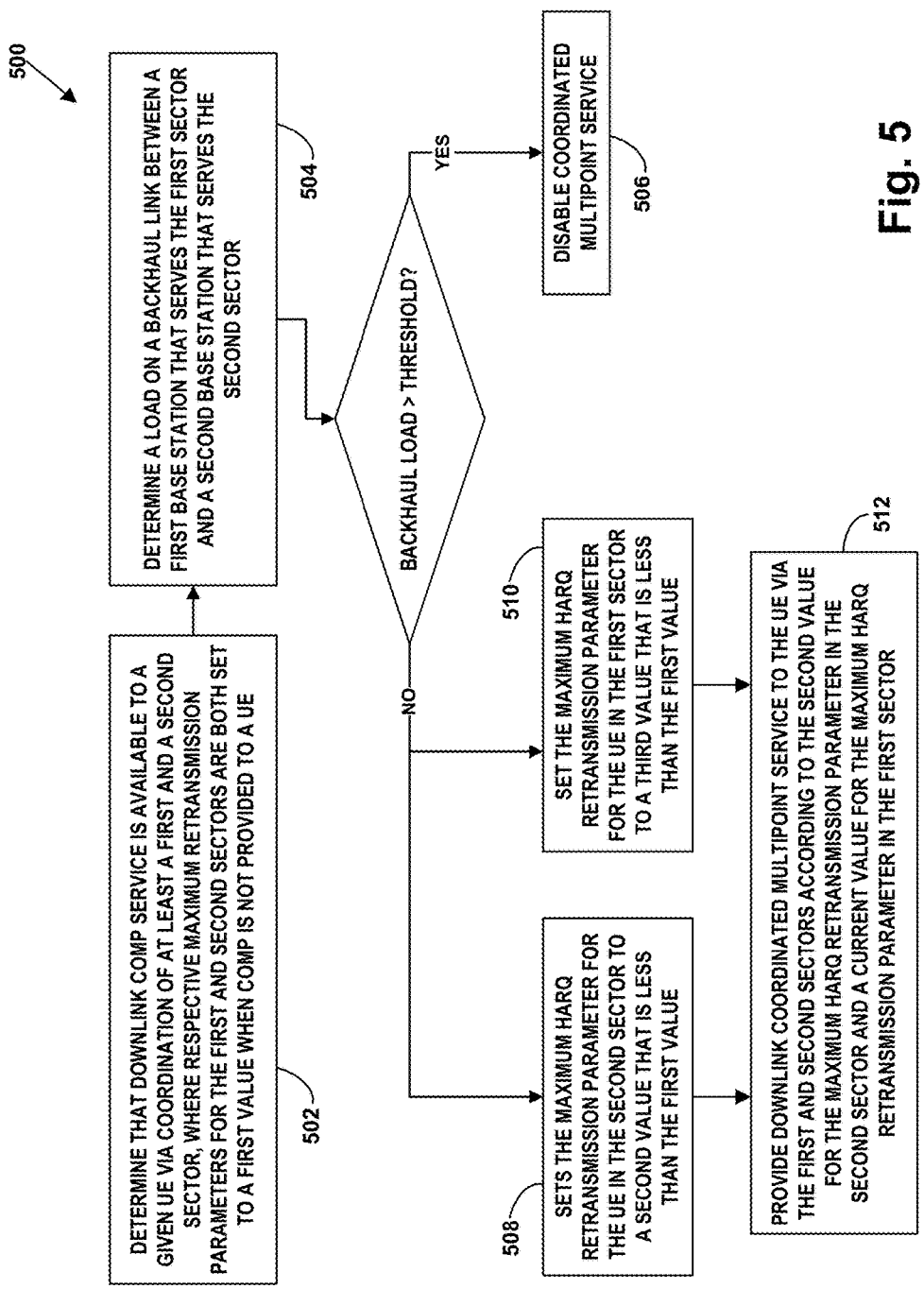
FIG. 5 is a flow chart illustrating another method, according to an exemplary embodiment.

For instance, a base station may selectively utilize downlink CoMP (e.g., by enabling and disabling downlink CoMP base on various factors), and a method such as method 400 may be applied when CoMP is utilized. As an example, FIG. 5 is a flow chart illustrating another method 500, according to an exemplary embodiment.

More specifically, method 500 involves a base station determining that downlink CoMP service is available to a particular UE via coordination of at least a first sector and a second sector, as shown by block 502. Further, the base station may determine a load on a backhaul link between a first base station that serves the first sector and a second base station that serves the second sector, as shown by block 504. In an LTE network, block 504 may involve determining the load (e.g., average or current percentage of bandwidth in use) on an X2 interface between a serving eNodeB and a neighbor eNodeB in a CoMP group.

If the load on the backhaul link is greater than or equal to a predetermined threshold, then the base station disables downlink CoMP service for the UE (or perhaps for all UEs served by the base station and/or its neighbor base station(s)), as shown by block 506. On the other hand, if the load on the backhaul link is less than a predetermined threshold, then the base station: (i) sets a maximum HARQ retransmission parameter for the particular UE in the second sector to a second value less than the first value, as shown by block 508, (ii) optionally sets a maximum HARQ retransmission parameter for the particular UE in the first sector to a third value that is less than the first value, as shown by block 510, and (iii) provides downlink CoMP service to the particular UE in the first and second sectors according to the respective current values of the maximum HARQ retransmission parameters in the first and second sectors, as shown by block 512.

In some embodiments, eNodeBs in a CoMP group may be configured to disable downlink CoMP when one or more X2 links between the eNodeBs are heavily loaded (e.g., greater than a predetermined threshold). In this scenario, a UE may be served in a single sector, and DL_MAX_HARQ may be set to a first value (e.g., allowing for a maximum of 5 attempts to transmit the same data). On the other hand, when one or more X2 links between the eNodeBs are lightly loaded (e.g., less than or equal to the predetermined threshold), then the base station (or base stations) may use joint transmission to provide service to UEs in the coordinating sectors, and also may apply blocks 508 to 512 in an effort to reduce the impact of a retransmission process on backhaul links.

For instance, method 500 may be applied to: (i) disable downlink CoMP in a CoMP group, but allow for a greater number retransmission attempts, when X2 links between sectors in the CoMP group are heavily loaded, and (ii) enable CoMP, but reduce the maximum number of retransmissions, when X2 links between sectors in the CoMP group are not heavily loaded. As a specific example, DL_MAX_HARQ may be set equal to 5 in all sectors in a CoMP group, when CoMP is disabled due to a high level of X2 traffic on one or more X2 links connecting the CoMP group. And, when the traffic level on these X2 links is lower, DL_MAX_HARQ may be reduced to 2 in all neighbor sectors, but left equal to 5 in the UE's source sector. Alternatively, DL_MAX_HARQ could also be reduced in the source sector (e.g., set equal to 3). Other implementations are also possible.

VI. CONCLUSION

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
   determining that downlink coordinated multipoint (CoMP) service is available to a user equipment (UE) via coordination of at least a first sector and a second sector, wherein respective maximum Hybrid Automatic Repeat Request (HARQ) retransmission parameters for UEs in the first and second sectors are both set to a first value for UEs that are not served with downlink CoMP;
   responsive to determining that downlink CoMP service is available to the UE, reducing the maximum HARQ retransmission parameter for the UE in the second sector to a second value that is less than the first value; and
   providing downlink CoMP service to the UE in the first and second sectors according to the second value for the maximum HARQ retransmission parameter in the second sector and a third value for the maximum HARQ retransmission parameter in the first sector, wherein the third value is less than or equal to the first value.

2. The method of claim 1, wherein the first sector and the second sector are a source sector and a neighbor sector, respectively, in a CoMP group serving the UE.

3. The method of claim 1, wherein the respective maximum HARQ retransmission parameter for the UE each sector specifies a maximum number of transmission attempts that can be made to the UE in the particular sector.

4. The method of claim 1, further comprising, as a further response to determining that downlink CoMP service is available to the UE, setting the maximum HARQ retransmission parameter for the first sector to the third value, wherein the third value is less than the first value.

5. The method of claim 4, wherein the third value is greater than the second value.

6. The method of claim 4, wherein the first value for the maximum HARQ retransmission parameter is 5, wherein the third value for the maximum HARQ retransmission parameter is 3, and wherein the second value for the maximum HARQ retransmission parameter is 2.

7. The method of claim 1, further comprising:
   retransmitting the communication in the first and second sectors to the extent allowed by the third value of the HARQ retransmission parameter in the first sector and the second value of the maximum HARQ retransmission parameter in the second sector, without success; and
   responsively: (a) increasing the HARQ retransmission parameter for the first sector, (b) increasing the HARQ retransmission parameter for the second sector, or (c) increasing the respective HARQ retransmission parameters for both the first and second sectors.

8. The method of claim 1, wherein the first sector is served by a first base station, and wherein the second sector is served by a second base station, the method further comprising:
   determining a load on a backhaul link between the first base station and the second base station; and
   using the determined load as a further basis for determining the HARQ retransmission parameter for the first sector, the HARQ retransmission parameter for the second sector or both.

9. The method of claim 1, wherein reducing the maximum HARQ retransmission parameter for the UE in the second sector comprises:
   sending, by a first base station serving the first sector, an instruction to a second base station serving the second sector, wherein the instruction indicates for the second base station to reduce the maximum HARQ retransmission parameter for the UE in at least the second sector.

10. A system comprising:
    at least one communication interface operable for backhaul communications between a first base station and a second base station;
    at least one processor; and
    program instructions stored in a non-transitory computer readable medium and executable by the at least one processor to:
      determine that downlink coordinated multipoint (CoMP) service is available to a user equipment (UE) via coordination of at least a first sector and a second sector, wherein respective maximum Hybrid Automatic Repeat Request (HARQ) retransmission parameters for UEs in the first and second sectors are both set to a first value for UEs that are not served with downlink CoMP;
      responsive to determining that downlink CoMP service is available to the UE, reduce a maximum HARQ retransmission parameter for the UE in the second sector to a second value that is less than the first value; and
      cause downlink CoMP service to be provided to the UE in the first and second sectors according to the second value for the maximum HARQ retransmission parameter in the second sector and a third value for the maximum HARQ retransmission parameter in the first sector, wherein the third value is less than or equal to the first value.

11. The system of claim 10, wherein the first sector and the second sector are a source sector and a neighbor sector, respectively, in a CoMP group serving the UE.

12. The system of claim 10, further comprising program instructions stored in a non-transitory computer readable medium and executable by the at least one processor to:

as a further response to determining that downlink CoMP service is available to the UE, set the maximum HARQ retransmission parameter for the first sector to the third value, wherein the third value is less than the first value.

13. The system of claim 12, wherein the first sector is a source sector in a CoMP group, and wherein the third value is greater than the second value.

14. The system of claim 10, further comprising program instructions stored in a non-transitory computer readable medium and executable by the at least one processor to:
determine a load on a backhaul link between the first base station and the second base station; and
use the determined load as a further basis for determining the HARQ retransmission parameter for the first sector, the HARQ retransmission parameter for the second sector or both.

15. The system of claim 10, further comprising program instructions stored in a non-transitory computer readable medium and executable by the at least one processor to:
determine a load on a backhaul link between the first base station and the second base station;
determine whether the load on the backhaul link is less than a predetermined threshold level, wherein reducing the HARQ retransmission parameter for the first sector, reducing the HARQ retransmission parameter for the second sector, or both, are conditioned upon a determination that the load on the backhaul link is less than the predetermined threshold level.

16. The system of claim 10, wherein the reduction of the maximum HARQ retransmission parameter for the UE in the second sector comprises:
sending, by a first base station serving the first sector, via the at least one communication interface, an instruction to a second base station serving the second sector, wherein the instruction indicates for the second base station to reduce the maximum HARQ retransmission parameter for the UE in at least the second sector.

17. A method comprising:
determining that downlink coordinated multipoint (CoMP) service is available to a user equipment (UE) via coordination of at least a first sector and a second sector, wherein the first sector is a serving sector for the UE and the second sector is a cooperating sector for the UE; and
responsive to determining that downlink CoMP service is available to the UE:
  (a) determining a load on a backhaul link between a first base station that serves the first sector and a second base station that serves the second sector;
  (b) when the load on the backhaul link is less than a predetermined threshold, then (i) setting a maximum HARQ retransmission parameter for the UE in the second sector to a second value, and (ii) providing downlink CoMP service to the UE in the first and second sectors according to the second value for the maximum HARQ retransmission parameter in the second sector and a first value for the maximum HARQ retransmission parameter in the first sector, wherein the first value is greater than or equal to the first second value; and
  (c) otherwise, when the load on the backhaul link is greater than or equal to the predetermined threshold, then disabling downlink CoMP service for the UE in at least the first sector.

18. The method of claim 17, wherein determining the load on a backhaul link comprises determining an X2 load on an X2 interface between the first base station and the second base station.

19. The method of claim 17, wherein the maximum HARQ retransmission parameter for the UE in the first sector is initially set to a third value, the method further comprising:
when the load on the backhaul link is less than a predetermined threshold, changing the maximum HARQ retransmission parameter for the UE in the first sector from the third value to the first value.

20. The method of claim 17, wherein the maximum HARQ retransmission parameter for the UE in the first sector is initially set to the first value, further comprising:
when the load on the backhaul link is less than a predetermined threshold, allowing the maximum HARQ retransmission parameter for the UE in the first sector to remain set to the first value.

* * * * *